(12) United States Patent
De Ambroggi et al.

(10) Patent No.: US 7,615,711 B2
(45) Date of Patent: Nov. 10, 2009

(54) SUPPORT FRAME FOR WALL MOUNTING AN ELECTRICAL APPARATUS

(75) Inventors: Renato De Ambroggi, Cocquio Trevisago (IT); Enrico Pianezzola, Luvinate (IT)

(73) Assignee: Bticino S.p.A., Milan (IT)

( * ) Notice: Subject to any disclaimer, the term of this patent is extended or adjusted under 35 U.S.C. 154(b) by 5 days.

(21) Appl. No.: 11/911,917

(22) PCT Filed: Apr. 21, 2006

(86) PCT No.: PCT/IT2006/000271

§ 371 (c)(1),
(2), (4) Date: Dec. 12, 2007

(87) PCT Pub. No.: WO2006/117817

PCT Pub. Date: Nov. 9, 2006

(65) Prior Publication Data

US 2008/0179087 A1   Jul. 31, 2008

(30) Foreign Application Priority Data

Apr. 29, 2005   (IT) .......................... RM2005A0201

(51) Int. Cl.
*H01R 13/46* (2006.01)
*H05K 5/00* (2006.01)
(52) U.S. Cl. ...................... 174/520; 361/809; 361/829; 206/707
(58) Field of Classification Search ................. 174/520; 206/707, 708; 361/809, 810, 825, 829
See application file for complete search history.

(56) References Cited

U.S. PATENT DOCUMENTS

| 4,261,465 | A | * | 4/1981 | Thomas | 206/708 |
|---|---|---|---|---|---|
| 4,324,330 | A | * | 4/1982 | Durney | 206/708 |
| 4,446,966 | A | * | 5/1984 | Moloney | 206/708 |
| 4,506,785 | A | * | 3/1985 | Seefeldt | 206/708 |
| 4,527,222 | A | * | 7/1985 | Swingley, Jr. | 361/797 |
| 5,879,185 | A | | 3/1999 | Handler et al. | |
| 6,606,248 | B2 | * | 8/2003 | Matthews | 361/752 |
| 2002/0096983 | A1 | | 7/2002 | Capella | |
| 2006/0144609 | A1 | * | 7/2006 | Hathaway | 174/58 |

OTHER PUBLICATIONS

PCT Written Opinion of the International Searching Authority for PCT/IT2006/00271, mailed Sep. 21, 2006.

* cited by examiner

*Primary Examiner*—Hung V Ngo
(74) *Attorney, Agent, or Firm*—Hogan & Hartson LLP

(57) ABSTRACT

Support frame (1) for wall mounting at least one electrical apparatus (20, 21, 22, 23), the frame (1) comprising: a surround casing (4) for wall fixing, enclosing an opening (5) that defines a assembly housing adapted to accepting and retaining said at least one electrical apparatus (20, 21, 22 and 23), the opening (5) being defined by a facing pair of fixing panels (6 and 7) and a facing pair of connecting panels (9 and 10) with ends attached to said fixing panels (6 and 7) and the fixing panels (6 and 7) comprising attachment elements (8) for mounting said at least one electrical apparatus (20, 21, 22 and 23). The connecting panels (9 and 10) include coupling components (11), adapted to engaging with respective complementary coupling components (12) substantially located on end sections of a divider (13) that can be removably coupled to said frame (1) to subdivide said opening.

21 Claims, 4 Drawing Sheets

SUPPORT FRAME FOR WALL MOUNTING AN ELECTRICAL APPARATUS

CROSS-REFERENCE TO RELATED APPLICATIONS

The present application is a national filing in the U.S. Patent & Trademark Office of PCT/IT2006/000271 filed Apr. 21, 2006, and claims priority of Italy Patent Application No. RM2005A000201 filed Apr. 29, 2005, both of which applications are incorporated herein in their entireties by this reference.

DESCRIPTION

The present invention relates to the technical field of electrical installations in residential and commercial premises and, more specifically, a support frame for wall mounting one or more electrical apparatuses.

1. Field of the Invention

For the purposes of this description, electrical apparatus means, in general, any electrical means or device normally forming part of electrical installations in civil buildings and the like and usually designed to be mounted, built in for example, on the walls of such buildings. This definition therefore includes, though not exclusively, switches, ring main sockets, data network sockets, TV sockets, telephone sockets, bell pushes, commutators, diverter switches, electrical control devices in general, connectors, thermostats, timers, fuseholders, bells and buzzers, emergency lamps, e.g. removable, indicator lamps such as step markers and LCD and the like.

2. Background of the Invention

As is well known, many of the above mentioned electrical apparatuses are usually wall mounted, using composite installation assemblies, normally including:

a box designed to be built into the wall, a mounting frame to house apparatus (support frame) that can be fixed to the box and comprising a frame casing enclosing an opening that defines a assembly housing adapted to accepting and retaining one or more electrical apparatuses and:

a cover plate that can be removably fixed to the frame, provided with an opening to give the user visual or manual access to the electrical apparatuses installed on the support frame.

As is well known, a support frame assembly housing is sized so as to accommodate an electrical apparatus or a series of combinations of modular electrical apparatuses side by side. In particular, support frames of the known art are adapted to accommodating configurations of different electrical apparatus in their assembly housings, all with a substantially identical first dimension and a variable secondary dimension equating to a integer multiple of a basic module. In the known art, a single module electrical apparatus normally means an electrical apparatus whose secondary dimension equates to the basic module, a two module electrical apparatus means an electrical apparatus whose secondary dimension equates to twice the basic module and so on.

A specific configuration of electrical apparatus can be accommodated in the assembly housing of a given support frame if the total number of modules relating to the electrical apparatuses in such a configuration is the same as the modular dimension of the support frame assembly housing. By way of example, if an assembly housing has a dimension of two modules, this means that the assembly housing can accommodate a single two-module electrical apparatus or two single module electrical apparatuses side by side.

By using simulated electrical apparatuses or "blank modules" that essentially fulfil the role of filling the empty spaces in an assembly housing, it is also possible to accommodate configurations of electrical apparatuses with an overall number of modules lower than the modular dimension of the assembly housing.

SUMMARY OF THE INVENTION

The object of the present invention is to provide a support frame that, in relation to the possible configurations of electrical apparatuses that can be accommodated in the support housing, offers greater flexibility than the support frames in the known art, described above.

This object is achieved by a support frame, as defined in the first of the attached claims in its general form and as defined in the dependent claims in certain more specific embodiments.

A further object of the present invention is to provide a set of components, in accordance with claim 10.

BRIEF DESCRIPTION OF THE DRAWINGS

The invention will be better understood from the following detailed description of one preferred embodiment thereof, given by way of example and by no means intended to be limiting, with reference to the attached drawings, in which.

DETAILED DESCRIPTION OF PREFERRED EMBODIMENTS

In the figures, identical or similar components are identified using the same numerical references.

Figure 1:
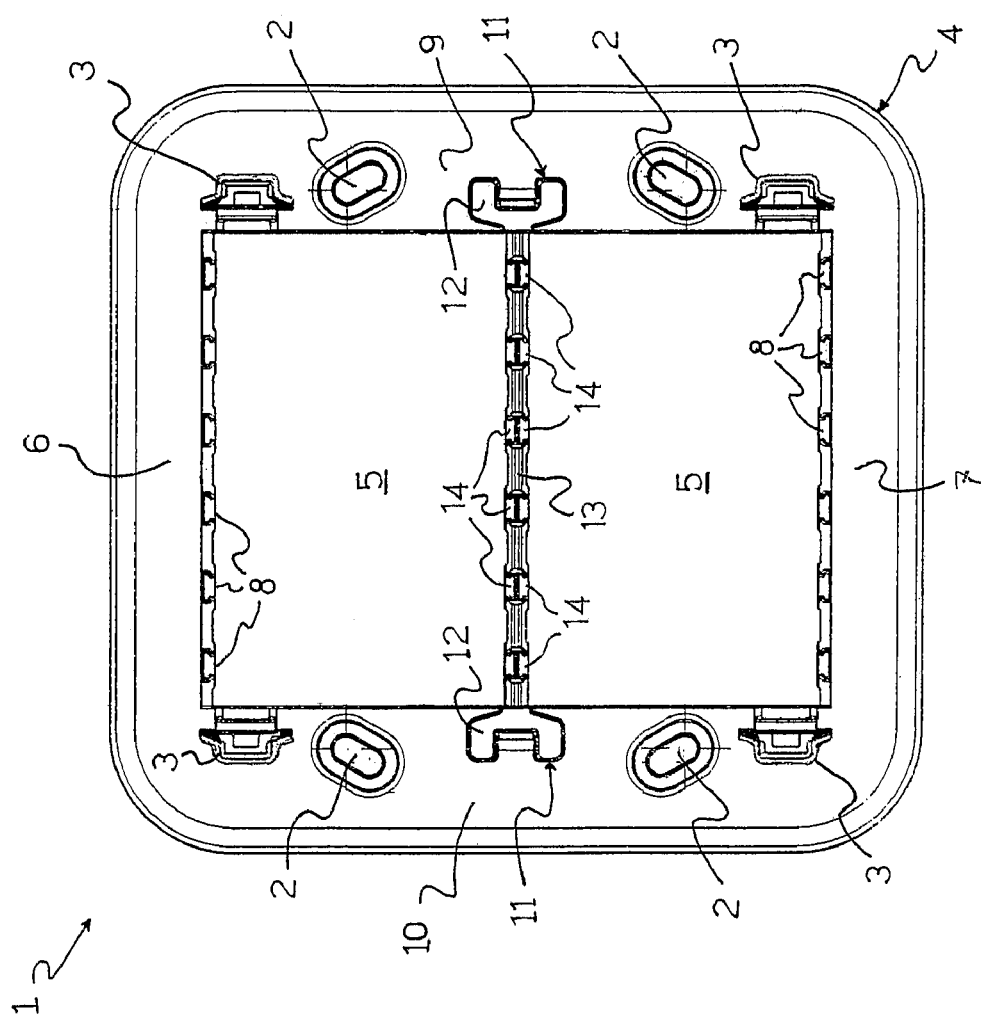
FIG. 1 is a planar front view of a particularly preferred embodiment of a support frame in accordance with the present invention, shown together with a divider accessory, connected to the frame.

FIG. 1 shows a plan view of a particularly preferred embodiment of a support frame in accordance with the present invention, designated in its entirety as 1. The support frame 1 includes means for wall fixing; for example, it includes two pairs of holes 2 through the frame casing 1, preferably slotted, adapted to receiving appropriate screws for fixing the support frame 1 to a box, built in to the wall.

The support frame 1 also includes coupling means for coupling the frame 1 to a cover plate, not shown in the figures. In the example shown in the figures, these coupling means take the form, only as an example, of four coupling channels 3, adapted to receiving corresponding fixing tabs fitted to the cover plate.

As a man skilled in the field will know, the function of such a cover plate is both to provide basic protection for the electrical apparatus, from dust for example, and to prevent any danger of access to the electrically conductive parts of the electrical apparatus, for example by means of pointed objects. In addition, another fundamental purpose to be performed by the cover plates is that of masking unsightly flaws created, for example, by the presence of a hollow in the wall and by the box and mounting frame that, rather than having any aesthetic value, have functional qualities that are not readily compatible with aesthetic requirements or criteria.

The casing 4 of the support frame 1 is preferably constructed of an insulating material and is essentially formed as a surround. More preferably, this casing should take the approximate form of a substantially plate shaped surround, for example but not exclusively as a rectangle with rounded corners. Solely by way of example, the surround casing 4 of the frame 1 has been shown as substantially rectangular in shape.

The surround casing 4 of the support frame 1 encloses an assembly opening 5 that forms a assembly housing adapted to accepting or retaining one or more electrical apparatuses, not shown in FIG. 1. The assembly opening 5 is defined by a facing pair of fixing panels 6 and 7, forming part of the surround casing 4 of the support frame 1. Each of these fixing panels includes a plurality of attachment elements 8 that project inwards from these panels 6 and 7 towards the assembly opening 5. In FIG. 1, only some of these attachment elements have been marked with the reference number 8.

The assembly opening 5 is also defined by a facing pair of connecting panels 9 and 10 forming part of the frame casing, with respective ends connected to the fixing panels 6 and 7.

The attachment elements 8, provided on the fixing panels 6 and 7, are such as to engage with corresponding complementary attachment elements provided on two opposite sides of the electrical apparatus to be attached to the support frame 1. Preferably, the attachment elements 8 of the fixing panels 6 and 7 enable a snap tab and release type of attachment to be created for attaching the electrical apparatuses to the support frame 1. More preferably, these attachment elements 8 include housings or slots adapted to accepting respective fixing tabs fitted to opposite sides of the electrical apparatuses to be attached to the support frame 1. Advantageously, the connecting panels 9 and 10 of the casing 4 of the support frame 1 include coupling elements 11 adapted to engaging with respective complementary coupling components (12) essentially located on end sections of a divider (13) that can be removably connected to the support frame 1 to subdivide the assembly opening 5 into several sub-openings. In the particular example shown in FIG. 1, the divider 13 allows the assembly opening 5 of the support frame to be divided into two sub-openings of essentially equal size. In a particularly preferred embodiment, the divider 13 is formed of a high strength engineering polymer such as, by way of example and not exclusively, glass-fibre reinforced nylon.

Preferably, the body of the divider 13 is essentially bar shaped, extending along its principal directional axis. In the configuration where the separating divider 13 is coupled to the support frame 1, this principal directional axis is essentially parallel to the fixing panels 6 and 7 of the support frame 1 and is essentially perpendicular to the connecting panels 9 and 10 of the support frame 1.

Advantageously, the divider 13 has two shaped surfaces, facing the fixing panels 6 and 7 respectively and including attachment elements 14, replicating the attachment elements 8 on the fixing panels 6 and 7 of the support frame casing 4. In practice, in the preferred embodiment where the fixing elements of the fixing panels 6 and 7 include housings 8 adapted to accepting tabs fitted to the electrical apparatuses, the divider 13 also has fixing elements 14 in the form of housings that are substantially identical to and aligned with corresponding housings provided in the fixing panels 6 and 7 of support frame 1.

Figure 2:
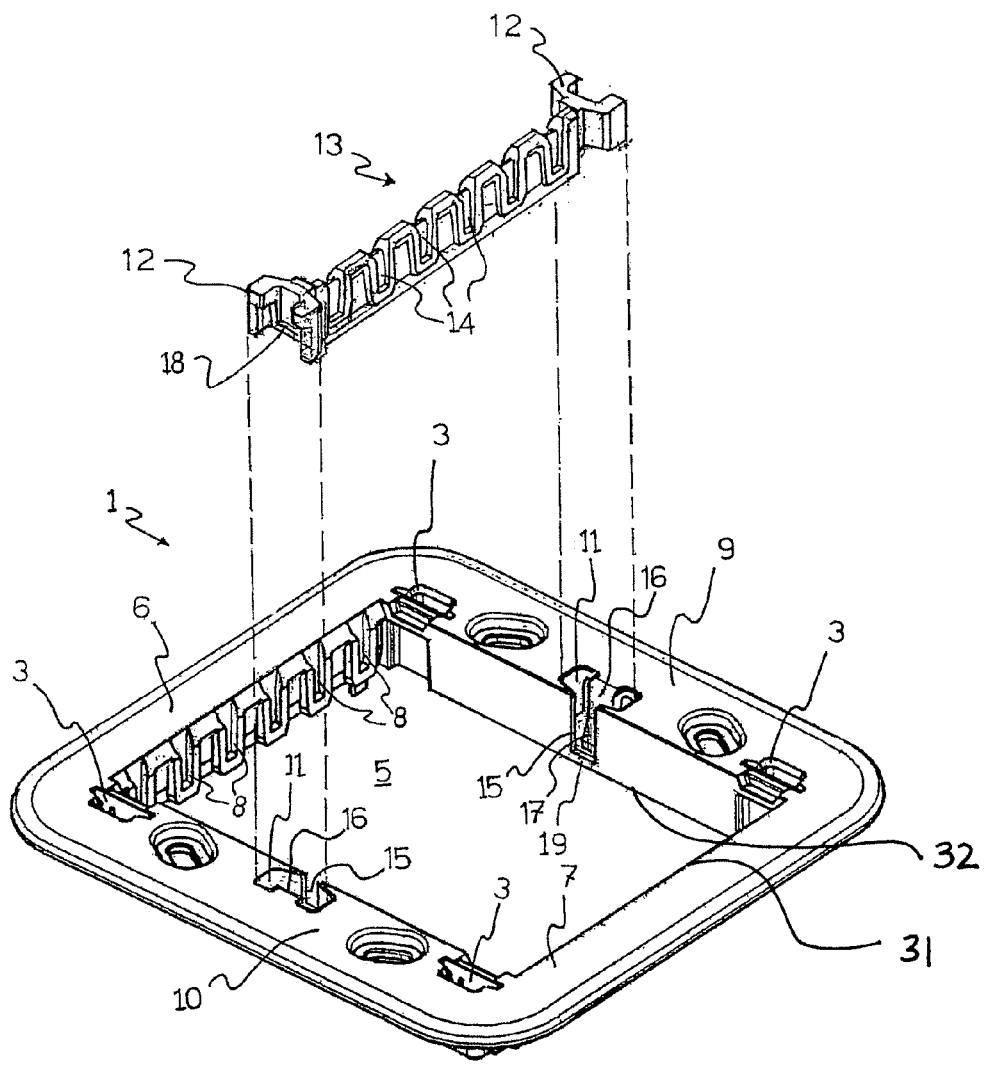
FIG. 2 is a perspective view of the support frame in FIG. 1, showing the divider accessory removed from the support frame.

FIG. 2 shows a perspective view of the support frame 1, in which the divider 13 is shown disconnected from the support frame 1. An upper edge 31 of the surround casing defines a generally rectangular shape of the opening 5 through the frame 1. A lower edge 32 of the surround casing also defines a generally rectangular shape of the opening 5 through the frame 1. In the embodiment shown, the two rectangular shapes are of a similar size.

In a particularly preferred arrangement, the divider 13 can be snap attached to the support frame 1.

As shown in the example in the figures, the coupling elements 11 provided on the support frame 1 preferably include coupling channels 11 with a substantially "C" or "U" shaped channel profile and with an opening 15 or notch in the channel wall, extending, partially at least, along the directional axis of the attachment channel 11 so as to bring the coupling channel 11 into contact with the assembly opening 5 of the support frame 1. The coupling elements 12 of the divider 13 include "C" or "U" shaped end sections of the divider 13 such that each of these can be slidably inserted into the respective coupling channel 11, until it reaches a snap attachment position. In this snap attachment position, the divider 13 crosses the opening 15 of the coupling channel 11.

Preferably, to obtain a snap attachment between the divider 13 and the support frame 1, the coupling channels 11 include, internally, a corresponding flexible tab 16 with one end bonded to the casing of the support frame 1 and an opposite end fitted with a lug 17 adapted to engaging, in the snap attachment position, against an undercut 18 provided on the end sections 12 of the "C" or "U" shaped divider.

As shown in FIG. 2, in a particularly advantageous embodiment, the divider 13 can be coupled to the support frame 1 by inserting the end sections 12 of the divider 13 from the front part of the support frame 1 into the coupling channels 11 of the frame until they reach the snap attachment position. The support frame also preferably includes stop devices 19 to prevent over-running the said snap attachment position. In the example shown in the figures, these stop devices include a partition 19 that interrupts the contact opening between the coupling channel 15 and the assembly window 5 so as to butt up against the divider 13 when the latter is attached to the support frame 1. In practice, these stop devices effectively serve to prevent the electrical apparatuses dropping dangerously inside the box.

On the basis of the above description, it is therefore possible to appreciate how, in comparison with support frames of the known art, a support frame 1 in accordance with the present invention offers greater flexibility as regards the configuration of electrical apparatuses that can be accommodated within the assembly opening 5.

Figure 3:
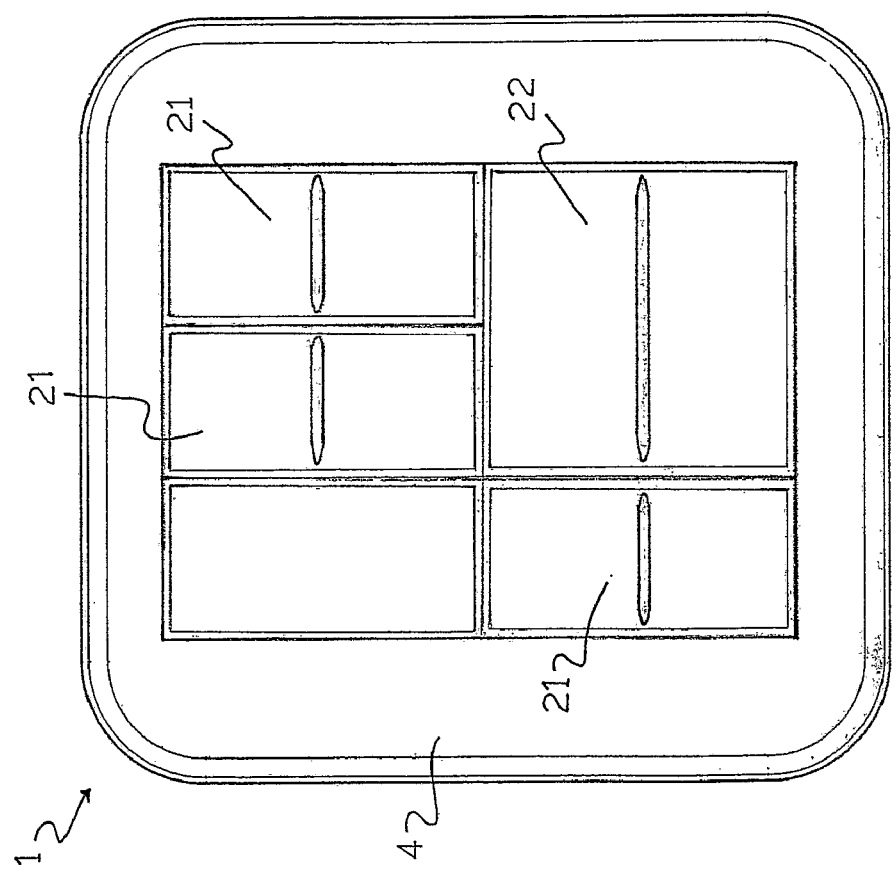
FIG. 3 schematically shows a first configuration of electrical apparatuses that can be accommodated in the support frame of FIG. 1.

For example, as shown schematically in FIG. 3, when the divider 13 is coupled to the support frame 1, it is possible not only to locate the electrical apparatuses 20, 21 and 22 side by side in a line but also to arrange them in several rows. In the particular example in FIG. 3, the divider creates two distinct sub-openings within the assembly window 5. The lower sub-opening accommodates two electrical apparatuses 21 and 22 representing, by way of example, a single module switch 21 and a two-module switch 22 respectively. The upper sub-opening accommodates two single module electrical apparatuses 21 and 21 representing two switches, by way of example and also accommodates a single module infill element 20 or blank module.

It should be borne in mind that it is always possible to provide more than one divider 13, to divide the assembly opening 5 of the support frame 1 into more than two sub-openings.

Figure 4:
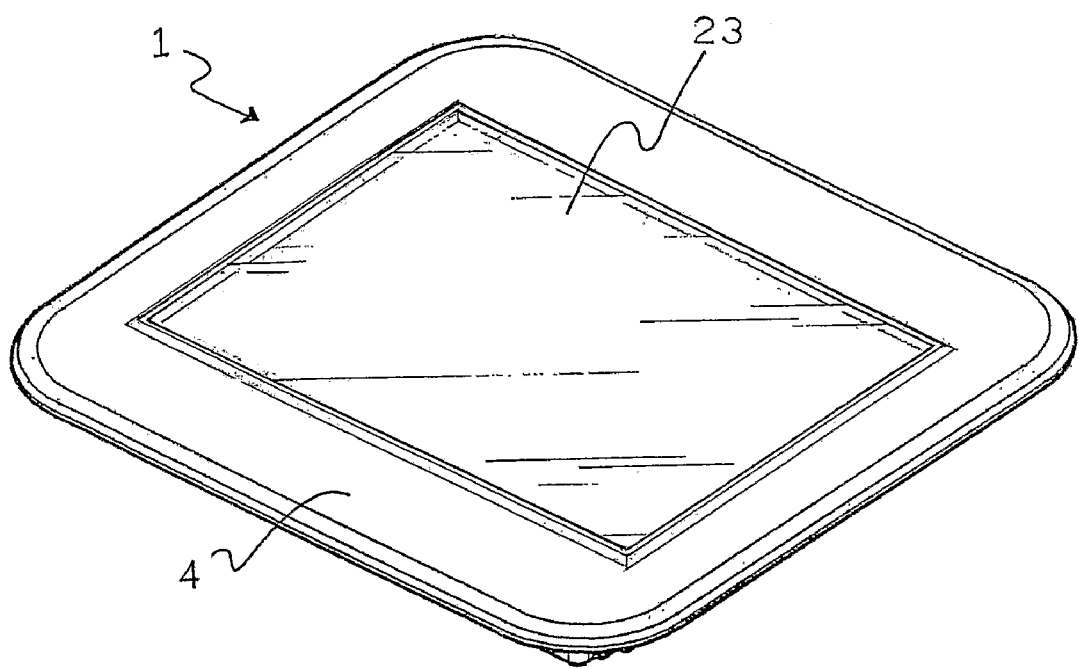
FIG. 4 schematically shows a second configuration of electrical apparatuses that can be accommodated in the support frame from FIG. 1.

In the example in FIG. 4, the divider 13 is removed from the support frame 1 and the assembly opening 5 can, for example, accept a single item of electrical apparatus 23 that occupies the entire assembly opening 5. In the particular example shown, the electrical apparatus 23 is a display unit, for example forming part of a touch-screen device. Other examples of electrical apparatus capable of occupying the entire assembly opening 5 include, though not exclusively, video entry-phones and controls for heating or air-conditioning installations and intruder alarms.

Obviously, a man skilled in the art can undertake numerous amendments and variations to the support frame described above in order to meet contingent or specific requirements, all however within the scope of protection of the invention, as defined in the claims that follow.

The invention claimed is:

1. Support frame for wall mounting at least one electrical apparatus, the frame comprising:
    a surround casing for wall fixing, enclosing an opening that forms an assembly housing for accepting and retaining said at least one electrical apparatus, the opening being defined by a facing pair of fixing panels and a facing pair of connecting panels with ends attached to said fixing panels and the fixing panels comprising attachment elements for mounting said at least one electrical apparatus, wherein the connecting panels include coupling elements adapted to engage complementary coupling components substantially located on end sections of a divider that can be removably coupled to said frame to subdivide said opening, wherein the coupling elements provided on the support frame including coupling channels with a substantially "C" or "U" shaped channel profile, each of said channels having an opening extending partially at least, along the axis of the channel and communicating with said opening, the coupling elements of said divider include "C" or "U" shaped end sections, each of said end sections operative for slidable insertion into a respective coupling channel until reaching a snap attachment position, and the coupling channels include, internally, a flexible tab fitted with a lug for engaging, in said snap attachment position, with an undercut formed on said "C" or "U" shaped end sections.

2. Support frame according to claim 1, in which said divider extends along a principal directional axis and can be coupled to the frame in such a way that said directional axis is essentially parallel to the fixing panels and essentially perpendicular to the connecting panels.

3. Support frame according to claim 2, wherein the support frame is a component of a set of components for wall mounting at least one electrical apparatus, the set further including said divider removably connected to the frame.

4. Support frame according to claim 1, in which the divider has two opposing shaped surfaces, facing a first and second panel respectively of said pair of fixing panels, the shaped surfaces including attachment elements replicating the attachment elements provided on the fixing panels.

5. Support frame according to claim 4, wherein the support frame is a component of a set of components for wall mounting at least one electrical apparatus, the set further including said divider removably connected to the frame.

6. Support frame according to claim 4, in which said coupling components of said divider include housings adapted to accepting tabs fitted to opposite sides of said at least one electrical apparatus.

7. Support frame according to claim 6, wherein the support frame is a component of a set of components for wall mounting at least one electrical apparatus, the set further including said divider removably connected to the frame.

8. Support frame according to claim 1, in which said divider is snap connected to said support frame.

9. Support frame according to claim 8, wherein the support frame is a component of a set of components for wall mounting at least one electrical apparatus, the set further including said divider removably connected to the frame.

10. Support frame according to claim 1, in which said divider serves to divide said opening into two sub-openings of equal size.

11. Support frame according to claim 10, wherein the support frame is a component of a set of components for wall mounting at least one electrical apparatus, the set further including said divider removably connected to the frame.

12. Support frame according to claim 10, in which said divider is coupled to said frame by inserting said end sections from the front of the frame into said coupling channels, the support frame also including stop means to prevent overrunning said insert position.

13. Support frame according to claim 12, wherein the support frame is a component of a set of components for wall mounting at least one electrical apparatus, the set further including said divider removably connected to the frame.

14. Support frame according to claim 1, wherein the support frame is a component of a set of components for wall mounting at least one electrical apparatus, the set further including said divider removably connected to the frame.

15. Support frame according to claim 1, wherein the support frame is a component of a set of components for wall mounting at least one electrical apparatus, the set further including said divider removably connected to the frame.

16. Support frame according to claim 1, further comprising:
    fixing means of said support frame for wall mounting said support frame and said at least one electrical apparatus.

17. Support frame according to claim 16, wherein the fixing means includes a plurality of holes in said support frame each operative to receive a fastener.

18. Support frame according to claim 17, in which said divider extends along a principal directional axis and can be coupled to the frame in such a way that said directional axis is essentially parallel to the fixing panels and essentially perpendicular to the connecting panels.

19. Support frame according to claim 17, in which the divider has two opposing shaped surfaces, facing a first and second panel respectively of said pair of fixing panels, the shaped surfaces including attachment elements replicating the attachment elements provided on the fixing panels.

20. Support frame according to claim 17, in which said coupling components of said divider include housings for accepting tabs fitted to opposite sides of said at least one electrical apparatus.

21. Support frame for wall mounting at least one electrical apparatus, the frame comprising:
    a surround casing for wall fixing, enclosing an opening therethrough in which an upper edge of the opening and a lower edge of the opening define generally rectangular shapes of a similar size, surround casing forming an assembly housing for accepting and retaining said at least one electrical apparatus, the opening being defined by a facing pair of fixing panels and a facing pair of connecting panels with ends attached to said fixing panels and the fixing panels comprising attachment elements for mounting said at least one electrical apparatus, wherein the connecting panels include coupling elements adapted to engage complementary coupling components substantially located on end sections of a divider that can be removably coupled to said frame to subdivide said opening, wherein the coupling elements provided on the support frame including coupling channels with a substantially "C" or "U" shaped channel profile, each of said channels having an opening extending partially at least, along the axis of the channel and communicating with said opening;

the coupling elements of said divider include "C" or "U" shaped end sections, each of said end sections operative for slidably inserting into a respective coupling channel until reaching a snap attachment position, wherein the coupling channels include, internally, a flexible tab fitted with a lug for engaging, in said snap attachment position, with an undercut formed on said "C" or "U" shaped end sections.

* * * * *